(12) United States Patent
Fan et al.

(10) Patent No.: US 9,372,030 B2
(45) Date of Patent: Jun. 21, 2016

(54) METHOD OF COOLING AN INTERNAL SPACE USING A SUPERABSORBENT POLYMER

(71) Applicants: Qinbai Fan, Chicago, IL (US); Ronald Stanis, Des Plaines, IL (US); Bogdan Gurau, Elmhurst, IL (US)

(72) Inventors: Qinbai Fan, Chicago, IL (US); Ronald Stanis, Des Plaines, IL (US); Bogdan Gurau, Elmhurst, IL (US)

(73) Assignee: Gas Technology Institute, Des Plaines, IL (US)

(*) Notice: Subject to any disclaimer, the term of this patent is extended or adjusted under 35 U.S.C. 154(b) by 257 days.

(21) Appl. No.: 14/251,839

(22) Filed: Apr. 14, 2014

(65) Prior Publication Data

US 2015/0292797 A1    Oct. 15, 2015

(51) Int. Cl.
*F25D 17/06* (2006.01)
*F25D 31/00* (2006.01)
*F25D 17/02* (2006.01)
*F25D 17/04* (2006.01)

(52) U.S. Cl.
CPC ............... *F25D 31/00* (2013.01); *F25D 17/02* (2013.01); *F25D 17/04* (2013.01)

(58) Field of Classification Search
CPC .... B01D 53/265; F24F 3/1405; F24F 5/0035; F25D 2400/30; F25D 17/02; Y02B 30/545
USPC .............................................. 62/64, 93, 259.4
See application file for complete search history.

(56) References Cited

U.S. PATENT DOCUMENTS

| 4,413,359 | A | * | 11/1983 | Akiyama | .................. | A61F 2/00 128/899 |
| 5,630,844 | A | * | 5/1997 | Dogan | ....................... | A61F 2/12 427/2.24 |
| 2009/0004266 | A1 | * | 1/2009 | Sung | ..................... | A61K 9/0056 424/456 |

* cited by examiner

*Primary Examiner* — Melvin Jones
(74) *Attorney, Agent, or Firm* — Pauley Erickson & Kottis

(57) ABSTRACT

A method and system for cooling an internal space are provided. A laminate of a hydrophobic membrane and a hydrophilic membrane includes a superabsorbent polymer disposed on or encompassing the hydrophilic membrane. The superabsorbent polymer increases the wicking capacity of the hydrophilic membrane so that water from a source is distributed more rapidly across the hydrophilic membrane. The distributed water is evaporated from the hydrophilic membrane, causing evaporative cooling of the laminate and surrounding air stream(s). The cooled air stream(s) are used to cool the internal space.

25 Claims, 1 Drawing Sheet

METHOD OF COOLING AN INTERNAL SPACE USING A SUPERABSORBENT POLYMER

FIELD OF THE INVENTION

This invention is directed to a method of cooling an internal space using a superabsorbent polymer to enhance water transport across a hydrophilic membrane.

BACKGROUND OF THE INVENTION

Evaporative cooling air conditioners are commonly used to cool the internal spaces of homes, factories and other buildings, especially in dry climates. Hydrophilic membranes, or laminates of hydrophilic and hydrophobic membranes, are used to transport and distribute water over a sufficiently large surface area. Warm dry air is blown or otherwise directed across the surface area to cause evaporation of the water, resulting in humidification and cooling of the air and cooling of the hydrophilic membrane or laminate. The cooled humidified air can then be used to cool the internal space. Alternatively, a separate stream of warm dry air can be passed along the hydrophobic side of the evaporatively cooled laminate. The separate air stream can be cooled by the laminate without humidification, and the cooled dry air can be used to cool the internal space.

In each case, the cooling capacity is dependent upon the evaporation rate of water from the hydrophilic membrane or laminate. The evaporation rate in turn depends upon the wet surface area of the hydrophilic membrane or laminate, the rate of water transport across the membrane or laminate, and the temperature, humidity and flow rate of the warm dry air. The rate of water transport depends upon the wicking rate and capacity of the hydrophilic membrane or laminate, which in turn depends upon the specific material(s) used to form the hydrophilic membrane.

SUMMARY OF THE INVENTION

The present invention is directed to a method of cooling an internal space. The method includes the steps of providing a laminate including a hydrophobic membrane and a hydrophilic membrane; transporting water across the hydrophilic membrane, resulting in distribution of the water across the hydrophilic membrane; and evaporating the water from the hydrophilic membrane, resulting in evaporative cooling of the laminate and formation of a stream of cool, moist air from the hydrophilic membrane; wherein the hydrophilic membrane includes a superabsorbent polymer.

The superabsorbent polymer improves the wicking rate of the hydrophilic membrane, enabling the rapid transport and distribution (via wicking) of a greater quantity of water across the hydrophilic membrane. The distribution of a greater quantity of water enables greater evaporation and greater evaporative cooling. The evaporative cooling is typically accomplished by blowing a stream of warm, dry air across the wet surface of the hydrophilic membrane. The resulting stream of cool, moist air can then be used to cool the internal space of a home, factory, or other building or structure. Alternatively, a second stream of warm, dry air can be blown across the hydrophobic membrane side of the evaporatively cooled laminate. The resulting stream of cooler air remains relatively dry because it does not experience an increase in moisture content due to the evaporation. The stream of cool, dry air can then be used to cool the internal space.

The present invention is also directed to a system for cooling an internal space. The system includes a laminate including a hydrophobic membrane and a hydrophilic membrane; a water source for supplying water to the hydrophilic membrane; resulting in the transporting and distribution of water from the source across the hydrophilic membrane; and an evaporation device for evaporating water from the hydrophilic membrane, resulting in evaporative cooling of the laminate and the formation of a stream of cool, moist air from the hydrophilic membrane; wherein the hydrophilic membrane includes a superabsorbent polymer.

With the foregoing in mind, it is a feature and advantage of the invention to provide a method and system for cooing an internal space using a hydrophilic membrane and laminate that have superior wicking properties due to the inclusion of a superabsorbent polymer. The improved wicking results in improved water transport and distribution across the laminate, greater evaporation of water from the laminate, and improved evaporative cooing of the laminate and adjacent air stream(s). These and other features and advantages will become further apparent from the following detailed description of the invention, read in conjunction with the accompanying drawings.

DESCRIPTION OF THE INVENTION

Figure 1:
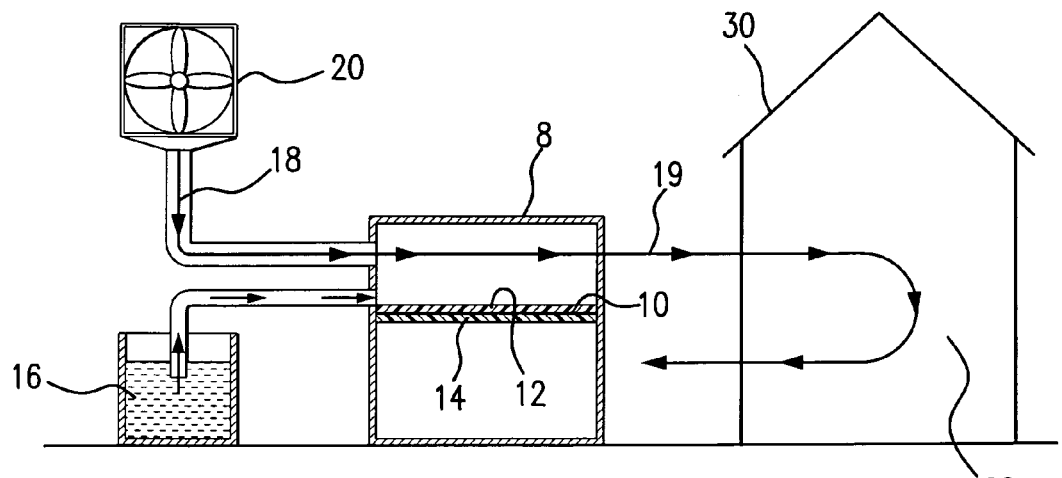
FIG. 1 schematically illustrates a first embodiment of the method and system of the invention.
Figure 2:
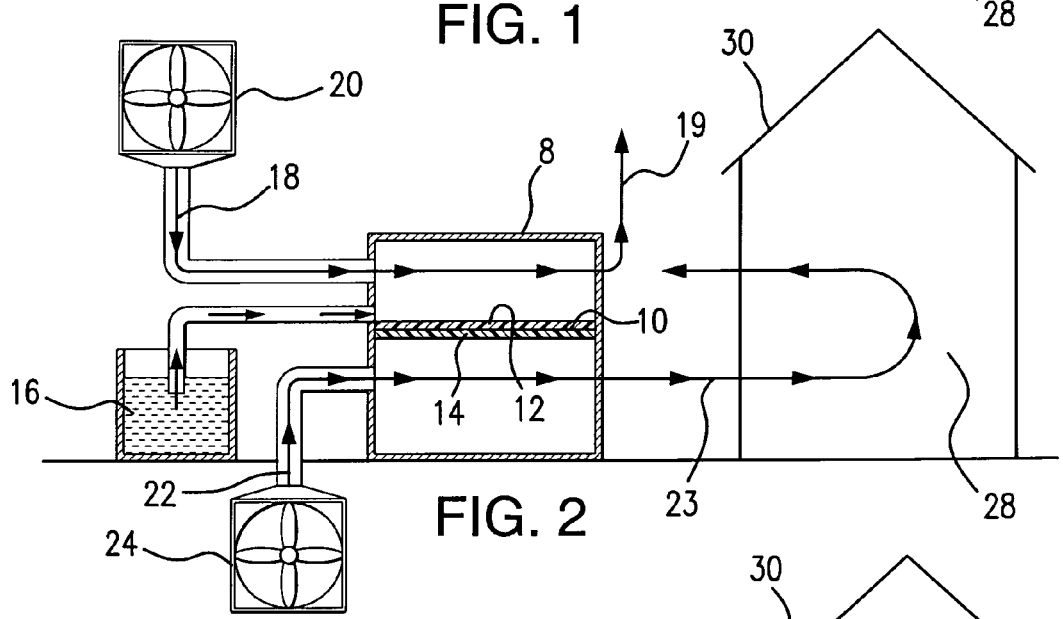
FIG. 2 schematically illustrates a second embodiment of the method and system of the invention.
Figure 3:
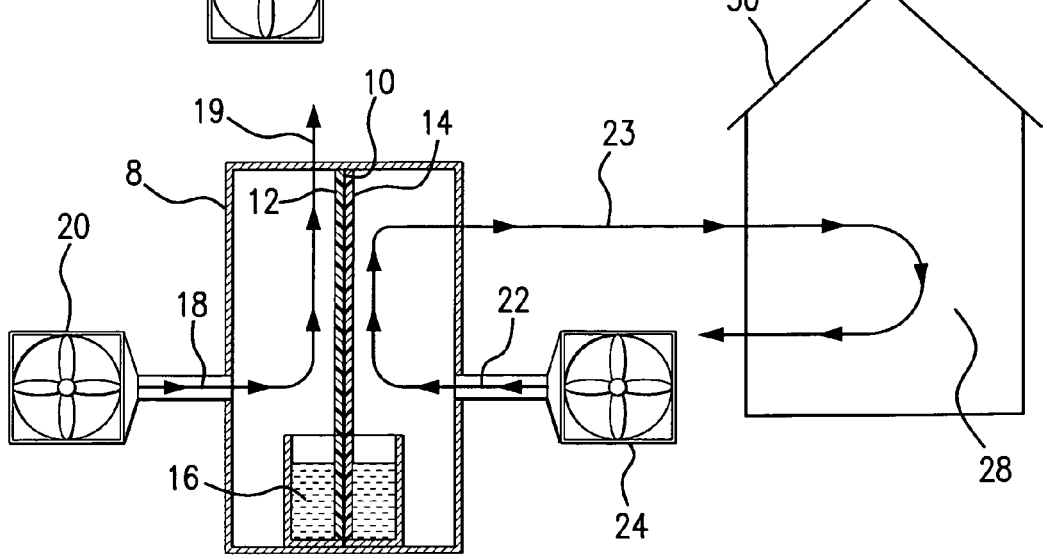
FIG. 3 schematically illustrates a third embodiment of the method and system of the invention.

The invention is directed to a method and a system for cooling an internal space as shown representatively in FIGS. 1-3. The method includes the step of providing a laminate 10 including a hydrophobic membrane and a hydrophilic membrane. The hydrophobic membrane 14 can be formed of any suitable hydrophobic material, and can be formed as a film, woven or nonwoven fabric, or foam. Suitable hydrophobic materials include without limitation, polypropylene and polyethylene homopolymers and copolymers, polytetrafluoroethylenes, polycarbonates, polyesters and the like, as well as foams made of suitable metals such as titanium or nickel. The hydrophobic membrane 14 suitably has a thickness of about 5 microns to about 5 millimeters, or about 10 microns to about 1 millimeter, or about 25 to about 250 microns.

The hydrophilic membrane 12 can be laminated to the hydrophobic membrane 14 using any suitable technique such as extrusion coating, extrusion lamination, coextrusion, spray coating, solvent dipping or the like, depending on the type of hydrophilic material being laminated. The hydrophilic membrane 12 includes a superabsorbent polymer. The superabsorbent polymer can be coated directly onto the hydrophobic membrane 14 to form the hydrophilic membrane 12. Alternatively, the hydrophilic membrane 12 can include a hydrophilic base material to which the superabsorbent material is applied, so that the combination of hydrophilic base material and superabsorbent polymer forms the hydrophilic membrane.

Superabsorbent polymers are polymers that can absorb very large amounts of water relative to their own mass. Superabsorbent polymers can absorb water in an amount from about 40 to about 800 times their own weight, commonly from about 100 to about 500 times their own weight. The superabsorbent polymer can be selected from natural, synthetic, and modified natural polymers. Examples of natural and modified natural superabsorbent polymers include without limitation hydrolyzed acrylonitrile-grafted starch, acrylic acid grafted starch, methyl cellulose, chitosan, carboxymethyl cellulose, hydroxypropyl cellulose, and natural gums such as alginates, xantham gum, locust bean gum and the like. Examples of synthetic superabsorbent polymers include without limitation alkali metal and ammonium salts of polyacrylic acid, polymethacrylic acid, polyacrylamides, polyvinyl ethers, hydrolyzed maleic anhydride copolymers with vinyl ethers and alpha olefins, polyvinyl pyrrolidone, polyvinyl morpholinone, polyvinyl alcohol or basic or chloride and hydroxide salts of polyvinyl amine, polyquaternary ammonium polyamine, hydrolyzed polyamide, and mixtures and copolymers thereof. These superabsorbent polymers can be crosslinked or partially crosslinked to optimize their wicking properties, or their contribution to the wicking properties of the hydrophilic membrane 12.

The superabsorbent polymer can include a zeolite. Zeolites are microporous aluminosilicate materials having a porous structure that can accommodate a wide variety of cations. Examples of mineral zeolites include analcime, chabazite, clinoptilolite, heuldanite, natrolite, phillipsite, and stillbite. Zeolites can be combined with superabsorbent polymers to form composites having both the highly absorbent properties of a superabsorbent and the ion exchange properties of a zeolite. The ion exchange properties help eliminate odors, bacteria and other unwanted substances from the air conditioner water used for evaporative cooling. For example, the zeolites can be combined with any of the foregoing synthetic superabsorbent polymers, suitably during synthesis and/or crosslinking of the superabsorbent polymer, using known methods.

When a hydrophilic base material is used, the base material can be selected from a wide variety of hydrophilic materials having wicking properties irrespective of the superabsorbent polymer, that are enhanced by the superabsorbent polymer. Suitable hydrophilic base materials include without limitation Manila paper, filter paper, and other cellulose materials. Cloth-like fabrics made from cotton and the like can also be used as the hydrophilic base material. The superabsorbent polymer can be applied to the hydrophilic base material by dipping, soaking, painting (brush coating), spray coating or the like. For example, the hydrophilic base material can be dipped or soaked in a solution containing the superabsorbent polymer. One exemplary solution includes isopropyl alcohol and water in a ratio of about 30-70 parts by weight isopropyl alcohol to about 30-70 parts by weight water, based on a combined 100 parts by weight isopropyl alcohol and water. A particularly suitable ratio is about 33 parts by weight isopropyl alcohol to about 67 parts by weight water. Other solvents and solvent combinations may also be employed, with the caveat that the precise solvents and component ratios have been found to significantly impact the wicking properties of the resulting superabsorbent-coated hydrophilic base material.

When used, the hydrophilic base material can have a thickness of about 10 microns to about 1 millimeter, suitably about 50 to about 500 microns. The superabsorbent polymer, whether coated onto the hydrophilic base material or directly onto the hydrophobic membrane, can have a dry coating thickness of about 5 to about 500 microns, suitably about 20 to about 100 microns. The overall hydrophilic membrane 12 can have a dry thickness of about 5 microns to about 1.5 millimeters, suitably about 20 to about 600 microns. The loading of superabsorbent polymer onto the hydrophilic base material or the hydrophobic membrane 14 can have a basis weight of about 0.3 to about 10 $mg/cm^2$, suitably about 0.5 to about 5 $mg/cm^2$, or about 1 to about 2 $mg/cm^2$.

The superabsorbent polymer can be crosslinked or partially crosslinked to optimize its contribution to the wicking properties of the hydrophilic membrane. Crosslinking can be accomplished using a suitable crosslinking agent, and can occur before or after (suitably after) the superabsorbent polymer is applied to the hydrophilic base material (if used) or directly to the hydrophobic membrane. A wide variety of known crosslinking agents may be employed, including without limitation methylene bisacrylamides; monofunctional aldehydes; 1,4-butanedioldiacrylate; ammonium persulfate; polyols; functionalized polyvinyl alcohols; alkylene carbonates; oxazolidone compounds; and the like. One suitable crosslinking agent is glyoxal, having the chemical formula OCHCHO. Crosslinking can be initiated using heat, radiation, and other known techniques. In one embodiment, the crosslinking is performed by heat treating the superabsorbent-coated hydrophobic membrane 14 at 100-150° C. in an oven for about 2.5-15 minutes, in the presence of the crosslinking agent. The crosslinking agent can be applied to the hydrophobic membrane 14 before, after and/or during application of the superabsorbent polymer, and is suitably applied before the superabsorbent polymer. The amount of crosslinking agent may vary, and can range from about 2% to about 40% based on the weight of the superabsorbent polymer, suitably about 10% to about 30% based on the weight of the superabsorbent polymer. In another embodiment, the superabsorbent-coated hydrophobic membrane 14 can be heat treated by hot rolling at a temperature of about 90-125° C. and a pressure of about 5-50 psig.

The method of the invention includes the step of transporting water across the hydrophilic membrane 12, resulting in distribution of the water across the hydrophilic membrane 12. As illustrated in FIGS. 1-3, this can be accomplished by horizontally or vertically wicking water from a source 16 across the hydrophilic membrane 12 of the laminate 10. While horizontal wicking (FIGS. 1-2) is faster, vertical wicking (FIG. 3) offers the convenience of dipping a lower portion of the vertically disposed laminate 10 in the water source 16, whereupon the water vertically wicks across hydrophilic membrane 12 toward an upper portion of the laminate 10. When horizontal wicking (FIGS. 1-2) is employed, the water from source 16 must be pumped, sprayed or otherwise mechanically transported to the laminate 10. The use of superabsorbent polymers in the hydrophilic membrane 12 facilitates vertical wicking by increasing the vertical wicking capacity of the laminate 10 compared to prior art hydrophobic membranes, as explained in the Examples below.

The method of the invention includes the step of evaporating the water from the hydrophilic membrane 12, resulting in evaporative cooling of the laminate 10 and formation of a stream of cool, moist air from the hydrophilic membrane. As shown in FIGS. 1-3, this can be accomplished by flowing a first stream 18 of warm, dry air from a source 20 (such as a blower) across the exposed surface of the hydrophilic membrane 12. As the first stream 18 of warm dry air passes across the hydrophilic membrane 12, it evaporates water from the hydrophilic membrane 12. This evaporation of water results both in evaporative cooling of the entire laminate 10 and the cooling and humidification of air stream 18, causing the formation of a stream 19 of cool, moist air. The stream 18 of warm, dry air is confluent with the stream 19 of cool, moist air, the former being converted into the latter due to the evaporation of water from hydrophilic membrane 12.

In the embodiment shown in FIG. 1, the stream 19 of cool, moist air is transported directly to the internal space 28 of building 30, and is used to cool the internal space 28. In the embodiments shown in FIGS. 2 and 3, the stream 19 of cool, moist air is exhausted or recycled, and is not used to cool the internal space 28. Instead, in the embodiments of FIGS. 2 and 3, a second stream 22 of warm, dry air from a second source 24 (which can be a blower) is caused to flow along the exposed surface of hydrophobic membrane 14 of laminate 10. The second stream 22 of warm, dry air is maintained separate from the first stream 18 of warm, dry air as they pass across the laminate 10, in order to prevent the second stream 22 from picking up moisture due to evaporation from the hydrophilic membrane 10. As the second stream 22 passes across the hydrophobic side of the evaporatively cooled laminate 10, the second stream 22 is cooled at relatively constant moisture content, resulting in the formation of a confluent stream 23 of cool, dry air. The stream 23 of cool dry air is then transported to the internal space 28 of building 30, and is used to cool the internal space 28.

In an alternative embodiment, the first stream 18 of warm, dry air and the second stream 22 of warm, dry air can originate from a single source, such as the blower 20. However, the first and second streams 18 and 22 are maintained separate from each other as they flow across opposing surfaces of the laminate 10. The hydrophobic membrane 14 prevents the penetration of water from the hydrophilic membrane 12 and moisture from the streams 18 and 19, thus enabling the separation of streams 22, 23 from streams 18, 19.

The invention is also directed to a system for cooling an internal space, which generally includes the elements described above with respect to FIGS. 1-3. The system 8 includes the laminate 10 including hydrophilic membrane 12 and hydrophobic membrane 14, wherein the hydrophilic membrane 12 includes a superabsorbent polymer. The system 8 includes a water source 16 for supplying water to the hydrophilic membrane 12, resulting in transportation and distribution (suitably by wicking) of water from the source across the hydrophilic membrane. The water source 16 can be a water basin as shown in FIGS. 1-3, or can be any suitable apparatus such as a pump, nozzle, spraying device or the like.

The system 8 also includes an evaporation device for evaporating water from the hydrophilic membrane 12, resulting in evaporative cooling of the laminate 10 and the formation of a stream 19 of cool, moist air from the hydrophilic membrane 12. The evaporation device can include the source 20 of warm, dry air (FIGS. 1-3) which can be a blower, which generates and causes a stream 18 of warm, dry air to flow across the hydrophilic membrane 12, resulting in formation of the stream 19 of cool, moist air and evaporative cooling of laminate 10. The system 8 can also include apparatus for generating and transporting cooled air from the evaporatively cooled laminate to the internal space, for cooling of the internal space. The apparatus can include a blower, conduit or other device for generating and transporting the stream 19 of cool, moist air to the internal space 28 of building 30 as shown and described above with respect to FIG. 1. Alternatively, the apparatus can include a blower, conduit or other device for generating and transporting a separate stream 23 of cool, dry air to the internal space 28 of building 30 as shown and described above with respect to FIGS. 2 and 3.

EXAMPLES

A polypropylene nonwoven fabric having a starting (uncoated) thickness of 8 mils (200 microns) and a starting basis weight of 0.48 grams/cm$^3$ was used as the hydrophobic membrane in each of the following experiments. The polypropylene fabric was cut into strips, each having a length of 7 cm and a width of 1.6 cm. Each strip was spray coated with a starch grafted sodium polyacrylate superabsorbent polymer available from Grain Processing Corporation under the product name WATER LOCK, and dried. The spray solution used was a 0.25% by weight superabsorbent polymer in a 3:1 volume ratio solution of water and isopropyl alcohol. Each coated strip was then cut lengthwise into two strips having a length of 7 cm and a width of 0.8 cm. The two 0.8 cm wide strips were then treated differently from each other for comparison.

To measure the wicking properties, the strips were affixed to a hanging bar and were hung vertically from the bar. A bowl of blue dyed water (colored with blue food coloring) was placed at a lower end of the strips such that the bottom 1 cm of each 7 cm strip became immersed in the blue water. The wicking height was measured at intervals until the blue water reached a maximum, steady state height on each strip. The bowl of blue water was then lowered from the strips, and the strips were permitted to dry. After drying, the dipping in blue water was repeated at least once for each of the strips and the wicking heights were again measured.

The results of several experiments are described individually below. It was generally concluded that the ideal coating of superabsorbent polymer is about 1 mg/cm$^2$ with a dried coating thickness of about 50 microns. The superabsorbent polymer is ideally crosslinked for improved durability. A suitable crosslinking agent (which was used in these Examples) is glyoxal, an aldehyde with the formula OCHCHO. The crosslinking agent is suitably applied to the fabric as a 1% by weight suspension in isopropyl alcohol at a loading of about 0.16 mg/cm$^2$ before the superabsorbent polymer is applied. After the superabsorbent polymer is applied, the coated fabric is suitably heat treated by oven baking at about 107-140° C. for 60 minutes, by hot rolling at about 80-115° C. and 10-40 psig at a rate of 1.5 ft/minute, or by hot pressing at 80-120° C., 2000-10000 lbs for 1-5 minutes for improved durability during wet/dry cycling.

Example 1

Six polypropylene fabric strips were evaluated for wicking properties. Two were untreated controls, two had a medium superabsorbent polymer coating of 1.9 mg/cm$^2$ (one crosslinked, one not), and two had a heavier superabsorbent polymer coating of 2.4 mg/cm$^2$ (one crosslinked, one not). The crosslinking agent was diluted with water to a concentration of 5% by weight and was hand paint brushed onto the fabric after the superabsorbent polymer had been applied and dried.

The 7 cm strips were vertically suspended above blue dyed water with 1 cm of their lengths immersed for 73 minutes. The untreated controls showed no vertical wicking. Both superabsorbent-coated samples that were not crosslinked vertically wicked along their entire 6 cm exposed lengths. The superabsorbent-coated samples that had been crosslinked vertically wicked to a much lesser extent, to about 1-2 cm of their exposed lengths.

The samples were rinsed and dried, and the wicking experiment was repeated the next day for 85 minutes. The rinsing was performed using sufficient deionized water to remove all of the blue food coloring. This time, none of the superabsorbent-coated samples wicked more than about 1 cm. These experiments demonstrated that the superabsorbent-coated samples without crosslinking were not durable, yet the crosslinking technique tested was not useful.

Example 2

Six polypropylene fabric strips were evaluated for wicking properties. Two were spray coated with 0.3 mg/cm² superabsorbent polymer (one crosslinked, one not), two with 0.6 mg/cm² superabsorbent polymer (one crosslinked, one not) and two with 1.4 mg/cm² superabsorbent polymer (one crosslinked, one not). Crosslinking was accomplished by dipping the dried superabsorbent-coated strips in an aqueous solution of 1% by weight crosslinking agent for a period of 10 seconds, followed by baking at 80° C. for 2 hours. The strips were then suspended above blue dyed water as explained above for a period of 134 minutes.

The crosslinked samples showed no vertical wicking at all. The non-crosslinked samples vertically wicked to about 1 cm for the 0.3 mg/cm² coating, about 4 cm for the 0.6 mg/cm² coating, and about 5-6 cm for the 1.4 mg/cm² coating.

The samples were rinsed and dried, and the wicking experiment was repeated the next day for 164 minutes. Again, the crosslinked samples showed no wicking. The non-crosslinked samples vertically wicked only to about 1-2 cm. These experiments demonstrated that a superabsorbent polymer coating of 1.4 mg/cm² or higher was ideal, but not durable, and the crosslinking method tested was not useful.

Example 3

Five polypropylene fabric strips were evaluated for wicking properties. Instead of being spray coated with superabsorbent polymer individually, the five strips were spray coated together in a group of four, allowing sufficient drying time before additional coatings were applied to reach a targeted coating of 1.2 mg/cm². Within the group of four, the first strip was not treated with a crosslinking agent. The second strip was treated with isopropyl alcohol before spraying with superabsorbent and was later cut into two halves (representing second and third strips). The first half had no crosslinking agent. The second half (after coating with superabsorbent) was later treated with 1% by weight crosslinking agent isopropyl alcohol. The fourth strip was pretreated with the crosslinking agent solution before spraying with superabsorbent polymer. The fifth strip was treated with the crosslinking agent solution immediately after spray coating with superabsorbent polymer, before the coating had dried. All five strips were heated at 80° C. for 1 hour in an oven, then hot pressed at 80° C. and 4000 lbs for 5 minutes, before performing the wicking tests.

The five strips were suspended above blue dyed water as explained above for 64 minutes, and were observed after 14 minutes and 64 minutes. The first strip (devoid of crosslinking) showed vertical wicking of about 1 cm at 14 minutes and about 2 cm at 64 minutes. The second strip (pre-treated with isopropyl alcohol but devoid of crosslinking) showed vertical wicking of about 2 cm at 14 minutes and about 3 cm at 64 minutes. The third strip (pre-treated with isopropyl alcohol and post-treated with crosslinking agent) showed vertical wicking of about 2.5 cm at 14 minutes and over 5 cm at 64 minutes. The fourth strip (pre-treated with crosslinking agent) showed vertical wicking of less than 1 cm at 14 minutes and about 2 cm at 64 minutes. The fifth strip (post-treated with crosslinking agent immediately after spraying with superabsorbent polymer, before drying) showed the best vertical wicking of 6 cm at 14 minutes and 6 cm at 64 minutes.

The five samples were rinsed and dried, and the wicking experiments were repeated a second time for 59 minutes. The samples were again rinsed and dried, and the wicking experiments were repeated a third time for 188 minutes. All five strips showed repeated wash cycle durability, with very little or no loss in vertical wicking the second and third times, compared to the first time. However, there was evidence of some of the superabsorbent polymer breaking loose after two wash cycles

Example 4

Eight polypropylene fabric strips having widths of 1.6 cm and lengths of 7 cm were spray coated with 1 mg/cm² superabsorbent polymer (using the 0.25% solution in 3:1 water/isopropyl alcohol) and labeled A through H. After cutting each strip in half to yield two smaller strips of 0.8 cm width, each step was additionally labeled 1 (if not hot pressed) or 2 (if hot pressed at 80° C. and 10,000 lbs for 5 minutes). The samples were crosslinked indicted in Table 1 below and were tested for vertical wicking for 3 hours (180 minutes) with observations at various increments. The results are shown in Table 1 below.

TABLE 1

Vertical Wicking Heights For Samples A-H

| | | Approx. Vertical Wicking, cm | | | |
|---|---|---|---|---|---|
| Sample | Crosslinking Treatment | 80 sec | 50 min | 134 min | 180 min |
| A1 | None | 1 | 1.5 | 2 | 2 |
| A2 | None | 1 | 3 | 4 | 4 |
| B1 | Pretreat 0.06 mg/cm² glyoxal | 1 | 2 | 2 | 2 |
| B2 | Pretreat 0.06 mg/cm² glyoxal | 1 | 4 | 4.5 | 4.5 |
| C1 | Pretreat 0.16 mg/cm² glyoxal | 1 | 2.5 | 2.5 | 3 |
| C2 | Pretreat 0.16 mg/cm² glyoxal | 1 | 4 | 4.5 | 4.5 |
| D1 | Pretreat and Post-treat 0.16 mg/cm² glyoxal | 1 | 3 | 3 | 3 |
| D2 | Pretreat and Post-treat 0.16 mg/cm² glyoxal | 1 | 6 | 6 | 6 |
| E1 | Post-treat 0.06 mg/cm² glyoxal | 1 | 5 | 5.5 | 6 |
| E2 | Post-treat 0.06 mg/cm² glyoxal | 1.5 | 6 | 6 | 6 |
| F1 | Post-treat 0.16 mg/cm² glyoxal | 5 | 6 | 6 | 6 |
| F2 | Post-treat 0.16 mg/cm² glyoxal | 5 | 6 | 6 | 6 |
| G1 | Mid-spray treat 0.16 mg/cm² glyoxal | 1.5 | 6 | 6 | 6 |
| G2 | Mid-spray treat 0.16 mg/cm² glyoxal | 1.5 | 4 | 4.5 | 4.5 |
| H1 | Pre, mid and post-spray treat 0.06 mg/cm² glyoxal | 1 | 4 | 4.5 | 4.5 |
| H2 | Pre, mid and post-spray treat 0.06 mg/cm² glyoxal | 1.5 | 5 | 5 | 5 |

The foregoing samples were rinsed and dried, and the wicking test was repeated for 3 additional cycles. Table 2 compares the wicking results for the first, second, third and fourth cycles.

TABLE 2

Wicking Heights For Repeated Cycles

| | Approx. Vertical Wicking, cm | | | |
|---|---|---|---|---|
| Sample | 1st Cycle (180 min) | 2nd Cycle (360 min) | 3rd Cycle (465 min) | 4th Cycle (442 min) |
| A1 | 2 | 2 | 2 | 0 |
| A2 | 4 | 4.5 | 4.5 | 4.5 |
| B1 | 2 | 2.5 | 2.5 | 0 |
| B2 | 4.5 | 4.5 | 4.5 | 4.5 |

TABLE 2-continued

Wicking Heights For Repeated Cycles

| | Approx. Vertical Wicking, cm | | | |
|---|---|---|---|---|
| Sample | 1st Cycle (180 min) | 2nd Cycle (360 min) | 3rd Cycle (465 min) | 4th Cycle (442 min) |
| C1 | 3 | 3 | 3 | 0 |
| C2 | 4.5 | 4.5 | 5 | 5 |
| D1 | 3 | 3 | 3 | 3 |
| D2 | 6 | 4.5 | 5 | 3.5 |
| E1 | 6 | 6 | 2 | 0 |
| E2 | 6 | 6 | 6 | 6 |
| F1 | 6 | 6 | 0 | 0 |
| F2 | 6 | 6 | 0 | 0 |
| G1 | 6 | 1 | 0 | 0 |
| G2 | 4.5 | 4 | 0 | 0 |
| H1 | 4.5 | 4 | 4 | 0 |
| H2 | 5 | 5 | 4.5 | 1 |

The sample with the highest wicking and longest durability was E2, which was both post-treated with 0.06 mg/cm² crosslinking agent and hot pressed at 80° C. and 10,000 lbs for 5 minutes. Samples E1, F1 and F2 also exhibited the highest wicking (along with E2) for the first and second cycles, but only E2 retained the high wicking for the third and fourth cycles. As a general rule, the samples that were hot pressed exhibited higher wicking and/or greater durability than corresponding samples that were not hot pressed.

Example 5

The purpose of Example 5 was to determine the durability of the wicking of the coated fabric strips as a function of crosslinking agent application time, crosslinking agent content and heat treatment method. Eight strips having widths of 1.6 cm and lengths of 7 cm were spray coated with 1 mg/cm² superabsorbent polymer. Strips A and B were pretreated with 0.16 mg/cm² crosslinking agent, and strips C and D were pretreated with 0.32 mg/cm² crosslinking agent, before spray coating with superabsorbent polymer. Strips E and F were post-treated with 0.06 mg/cm² crosslinking agent, and strips G and H were post-treated with 0.12 mg/cm² crosslinking agent, after spray coating with superabsorbent polymer. The coated, treated strips were cut in halves having widths of 0.8 cm, and the halves were labeled 1 (indicating hot pressing at 80° C., 10,000 lbs, 5 minutes) or 2 (indicating hot pressing at 107° C., 2,000 lbs, 2.5 minutes). The strips were then tested for wicking over a total of six cycles (a first cycle followed by five rinsing and drying cycles). Each cycle involved dipping the lower 1 cm of the strips in blue dyed water for about 2 hours. The results are reported in Table 3 for the first five cycles.

TABLE 3

Wicking Heights For Repeated Cycles (cm)

| Sample | Cycle 1 (20 min) | Cycle 1 (2 hrs) | Cycle 2 | Cycle 3 | Cycle 4 | Cycle 5 |
|---|---|---|---|---|---|---|
| A1 | 6 | 6 | 6 | 6 | 6 | 6 |
| A2 | 3 | 6 | 6 | 6 | 6 | 6 |
| B1 | 6 | 6 | 6 | 6 | 6 | 6 |
| B2 | 1 | 4 | 6 | 6 | 6 | 6 |
| C1 | 4 | 6 | 6 | 6 | 6 | 6 |
| C2 | 1 | 6 | 6 | 6 | 6 | 6 |
| D1 | 3 | 6 | 6 | 6 | 6 | 6 |
| D2 | 1 | 3 | 3 | 3 | 3 | 6 |
| E1 | 3 | 3 | 6 | 6 | 6 | 6 |
| E2 | 6 | 6 | 6 | 6 | 6 | 6 |
| F1 | 4 | 4.5 | 6 | 6 | 6 | 6 |
| F2 | 5 | 6 | 6 | 6 | 4 | 0 |
| G1 | 6 | 6 | 6 | 6 | 6 | 6 |
| G2 | 6 | 6 | 6 | 6 | 6 | 6 |
| H1 | 6 | 6 | 6 | 6 | 6 | 0 |
| H2 | 6 | 6 | 6 | 6 | 6 | 0 |

It was observed that most of the strips wicked the full 6 cm over the six cycles although some were missing patches due to polymer delamination. Samples A2 and B2 appeared to be the most durable, while C2 and D2 were also very good. The worst looking strips were E1, F1, G1 and C1. Based on these experiments, the crosslinking agent is best applied to the fabric before the superabsorbent polymer. Hot pressing at relatively high temperature (107° C.) and low pressure (2,000 lbs) results in greater durability.

Example 6

The purpose of these experiments was to compare baking, hot rolling and hot pressing. Eight strips of polypropylene fabric were loaded with 1 mg/cm² superabsorbent polymer and 0.16 mg/cm² of crosslinking agent, with the crosslinking agent applied before the superabsorbent polymer was sprayed. The strips were labeled A through H. Strips E, F, G and H were cut in half and each half was labeled 1 (indicating hot pressing at 107° C., 2,000 lbs 2.5 minutes) or 2. Strip E2 was hot rolled at 1.5 ft/min using 3 sequential rollers at 107° C. and 30 psig. Strip F2 was baked in an oven at 107° C. for 5 minutes with no pressure. Strip G2 was baked in an oven at 107° C. for 30 minutes with no pressure. Strip H2 had no heat or pressure treatment.

The strips were subjected to the vertical wicking test for about two hours. Then the strips were rinsed and dried. The vertical wicking test, followed by rinsing and drying, was repeated for a total of six cycles. The results are shown in Table 4.

TABLE 4

Wicking Heights For Repeated Cycles (cm)

| Sample | Cycle 1 (18 min) | Cycle 1 (135 min) | Cycle 2 (120 min) | Cycle 3 (120 min) | Cycle 4 (120 min) | Cycle 5 (120 min) | Cycle 6 (60 min) |
|---|---|---|---|---|---|---|---|
| E1 | 4 | 6 | 5 | 5 | 6 | 5 | 4 |
| E2 | 2.5 | 6 | 6 | 6 | 6 | 6 | 6 |
| F1 | 4 | 6 | 6 | 6 | 6 | 6 | 6 |
| F2 | 3 | 6 | 6 | 6 | 6 | 6 | 6 |
| G1 | 4 | 6 | 6 | 5 | 6 | 6 | 6 |
| G2 | 3 | 6 | 6 | 6 | 6 | 6 | 6 |
| H1 | 4 | 6 | 6 | 6 | 6 | 6 | 6 |
| H2 | 4 | 6 | 0 | 0 | 0 | 0 | 0 |

The strip H2 that received no heat treatment had no vertical wicking after the first cycle. This demonstrated that heat treatment is essential to durability of the wicking following repeated rinsing. Strips E1 and F1 became visually worse after repeated cycles, while G1 and H1 remained robust. The hot rolled strip E2 and the oven baked strips F2 and G2 were durable and able to wick the full 6 cm each day. These results demonstrated that the type of heat treatment can affect the durability of the wicking and there was no significant difference in the performance of the oven baked strips whether they baked for 5 minutes or 30 minutes.

Example 7

This set of experiments varied the heat treatments of the coated polypropylene fabric and compared baking to hot rolling. Eight strips of fabric having lengths of 7 cm and widths of 1.6 cm were prepared per Example 6. Each strip was spray coated with 1 mg/cm² superabsorbent polymer. Each strip was coated with 0.16 mg/cm² of the crosslinking agent before the superabsorbent polymer was sprayed. Strips A, B, C and D were cut in half and each half was labeled 1 or 2. Strips labeled 1 were oven baked at temperatures of 107° C., 115° C., 123° C. and 140° C., respectively, for 5 minutes. Strips labeled 2 were hot rolled at temperatures of 107° C., 115° C., 123° C. and 100° C., respectively, using three rollers, 30 psig., and 1.5 ft/min. The hot rolling was performed using three sequential rollers at the selected temperature and 30 psig.

The samples were subjected to the vertical wicking test for two hours for a total of ten cycles, with rinsing and drying between each cycle. After six cycles, none of the strips showed significant delamination of superabsorbent polymers. Table 5 reports vertical wicking results for the first, second and tenth cycles.

TABLE 5

Vertical Wicking Heights For Repeated Cycles (cm)

| Sample | Cycle 1 (15 min) | Cycle 1 (120 min) | Cycle 2 (15 min) | Cycle 3 (30 min) | Cycle 10 (15 min) |
|---|---|---|---|---|---|
| A1 | 3 | 6 | 6 | 6 | 6 |
| A2 | 2 | 6 | 6 | 6 | 6 |
| B1 | 1.5 | 4.5 | 6 | 6 | 6 |
| B2 | 1.5 | 2.5 | 5.5 | 6 | 6 |
| C1 | 1.5 | 4.5 | 5 | 6 | 6 |
| C2 | 0 | 0 | 0 | 0 | 0 |
| D1 | 1 | 4 | 5 | 6 | 6 |
| D2 | 1 | 4.5 | 5.5 | 6 | 5.5 |

As shown above, the vertical wicking for most of these samples improved after the first cycle. Sample C2 was an outlier, showing no vertical wicking, because this sample was damaged by the hot rolling at 123° C. Sample D2 was hot rolled at a lower temperature (100° C.) after observing the damage to sample C2. It was concluded that oven baking at any of the temperatures without pressure can yield durable hydrophilic coatings. Hot rolling with pressure can also yield durable coatings if the temperature is not high enough to flatten or otherwise deform the coated polypropylene fabric.

Example 8

The purpose of these experiments was to determine if durable superabsorbent polymer coatings can be made using more concentrated spraying solutions in order to reduce the spraying volume, and thus reduce the number of spray coatings and the spraying time. Four polypropylene fabric strips, labeled A-D, were sprayed with a solution of 1% by weight superabsorbent polymer in a 3:1 volumetric ratio of water and isopropyl alcohol (four times higher than the 0.25% solution used in previous Examples). Another four polypropylene fabric strips, labeled E-H, were sprayed with an otherwise similar solution containing 2% by weight superabsorbent polymer. The strips were cut in half, and labeled 1 (indicating oven baking at 115° C. for 5 minutes) or 2 (indicating hot rolling at 107° C., three rollers, 30 psig, 1.5 ft/min). The wicking results for three cycles are indicted in Table 6.

TABLE 6

Vertical Wicking Heights For Repeated Cycles (cm)

| Sample | Cycle 1 (5 min) | Cycle 1 (15 min) | Cycle 1 (30 min) | Cycle 2 (15 min) | Cycle 3 (15 min) | Cycle 3 (120 min) |
|---|---|---|---|---|---|---|
| A1 | 0.5 | 1.5 | 2.5 | 3.5 | 5 | 5 |
| A2 | 0.5 | 1.5 | 2 | 3 | 3.5 | 5 |
| B1 | 0.5 | 1 | 4 | 4 | 5 | 5 |
| B2 | 0 | 1 | 2 | 4 | 5 | 6 |
| C1 | 1 | 2.5 | 4 | 5 | 6 | 6 |
| C2 | 1 | 2.5 | 6 | 5 | 5.5 | 6 |
| D1 | 0.5 | 2 | 4 | 4 | 5.5 | 6 |
| D2 | 2 | 2.5 | 4 | 4 | 5.5 | 6 |
| E1 | 0 | 0 | 1 | 0 | 0 | 0 |
| E2 | 0 | 0 | 1 | 0 | 0 | 0 |
| F1 | 0 | 0 | 1 | 0 | 0 | 0 |
| F2 | 0 | 0 | 2 | 0 | 0 | 2 |
| G1 | 0 | 1 | 2 | 2 | 0 | 1.5 |
| G2 | 0 | 0 | 1 | 0 | 0 | 0 |
| H1 | 0 | 0 | 1.5 | 0 | 0 | 0 |
| H2 | 0 | 1 | 2.5 | 0 | 0 | 0 |

The conclusions from these experiments were 1) polypropylene fabric samples sprayed with 2% superabsorbent polymer showed poor or no wicking, and 2) polypropylene fabric samples sprayed with 1% superabsorbent polymer provided inconsistent wicking but offered the potential for acceptable wicking, subject to further optimization.

Example 9

These experiments tested the wicking performance of polypropylene fabric samples sprayed with 0.5% and 0.75% by weight superabsorbent polymer solutions, lower than the concentrations tested in Example 8 but still higher than the 0.25% by weight solution used for the prior Examples. Fabric strips A-D were spray coated with 0.5% by weight superabsorbent polymer solution to reach the target coating level of 1 mg/cm². Strips E-H were spray coated with 0.75% by weight superabsorbent polymer solution to reach the same coating level. Each strip was coated with 0.16 mg/cm² crosslinking agent before the superabsorbent polymer was sprayed. The coated fabric strips were cut in half and labeled 1 (indicating oven baking at 115° C. for 5 minutes) or 2 (indicating hot rolling at 107° C., three rollers, 30 psig, 1.5 ft/min). The wicking results for three cycles are indicated in Table 7.

TABLE 7

Vertical Wicking Heights For Repeated Cycles (cm)

| Sample | Cycle 1 (5 min) | Cycle 1 (15 min) | Cycle 1 (60 min) | Cycle 1 (120 min) | Cycle 2 (143 min) | Cycle 3 (360 min) |
|---|---|---|---|---|---|---|
| A1 | 0.5 | 1 | 1 | 1.5 | 3 | 3 |
| A2 | 0 | 0.5 | 0.5 | 0.5 | 1 | 1 |
| B1 | 0 | 1 | 1.5 | 1.5 | 3 | 3 |
| B2 | 0 | 0.5 | 0.5 | 0.5 | 0.5 | 1 |
| C1 | 0.5 | 1 | 1.5 | 1.5 | 3 | 3 |
| C2 | 0 | 0.5 | 0.5 | 1 | 1.5 | 1.5 |
| D1 | 0.5 | 1 | 1.5 | 1.5 | 2 | 3 |
| D2 | 0 | 0.5 | 0.5 | 0.5 | 0.5 | 0.5 |
| E1 | 1 | 1.5 | 2 | 2 | 4 | 3 |
| E2 | 1 | 2 | 3 | 3 | 3 | 3.5 |

TABLE 7-continued

Vertical Wicking Heights For Repeated Cycles (cm)

| Sample | Cycle 1 (5 min) | Cycle 1 (15 min) | Cycle 1 (60 min) | Cycle 1 (120 min) | Cycle 2 (143 min) | Cycle 3 (360 min) |
|---|---|---|---|---|---|---|
| F1 | 0.5 | 1 | 2 | 2 | 2 | 3 |
| F2 | 0 | 1 | 2.5 | 3 | 5 | 4.5 |
| G1 | 0.5 | 1 | 2 | 2 | 3.5 | 2.5 |
| G2 | 0 | 0.5 | 2 | 2 | 3.5 | 4 |
| H1 | 0.5 | 1 | 2 | 2 | 2.5 | 2.5 |
| H2 | 1 | 1.5 | 2 | 2 | 2 | 2 |

Because none of the fabric strips wicked to the full 6 cm, a fair conclusion was that a superabsorbent spraying concentration of 0.25% by weight preforms better than the higher concentrations.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A method of cooling an internal space, comprising the steps of:
   providing a laminate including a hydrophobic membrane and a hydrophilic membrane;
   transporting water across the hydrophilic membrane, resulting in distribution of the water across the hydrophilic membrane; and
   evaporating the water from the hydrophilic membrane, resulting in evaporative cooling of the laminate and formation of a stream of cool, moist air from the hydrophilic membrane;
   wherein the hydrophilic membrane comprises a superabsorbent polymer.

2. The method of claim 1, wherein the hydrophobic membrane comprises a material selected from the group consisting of polypropylene and polyethylene homopolymers and copolymers, polytetrafluoroethylenes, polyesters, polycarbonates, and titanium foam, nickel foams, and combinations thereof.

3. The method of claim 1, wherein the superabsorbent polymer is applied directly to the hydrophobic membrane to form the hydrophilic membrane.

4. The method of claim 1, wherein the hydrophilic membrane comprises a hydrophilic base material to which the superabsorbent polymer is applied.

5. The method of claim 4, wherein the hydrophilic base material is selected from the group consisting of Manila paper, filter paper, other cellulose materials, cotton fabrics, and combinations thereof.

6. The method of claim 1, wherein the superabsorbent polymer is selected from the group consisting of hydrolyzed acrylonitrile-grafted starch; acrylic acid-grafted starch; methyl cellulose; chitosan; carboxymethyl cellulose; hydroxypropyl cellulose; natural gums; alkali metal and ammonium salts of polyacrylic acid, polymethacrylic acid, polyacrylamides and polyvinyl ethers; hydrolyzed maleic anhydride copolymers with vinyl ethers and alpha-olefins; polyvinyl pyrrolidone; polyvinyl morpholinone; polyvinyl alcohol; chloride and hydroxide salts of polyvinyl amine; polyquaternary ammonium polyamine; hydrolyzed polyamide; and combinations of the foregoing with each other and with zeolites.

7. The method of claim 3, wherein the superabsorbent polymer is spray coated onto the hydrophobic membrane.

8. The method of claim 3, wherein the superabsorbent polymer is crosslinked.

9. The method of claim 3, wherein the superabsorbent polymer has a basis weight of about 0.5 to about 5 mg/cm$^2$.

10. The method of claim 1, wherein the water is transported across the hydrophilic membrane by wicking.

11. The method of claim 1, wherein the step of transporting the water across the hydrophilic membrane comprises vertically positioning the laminate with a lower portion immersed in water and wicking the water vertically across the hydrophilic membrane toward an upper portion of the laminate.

12. The method of claim 1, further comprising the steps of flowing warm dry air adjacent to the hydrophobic membrane, cooling the dry air by passing it across the hydrophobic membrane of the cooled laminate, and transporting the cooled dry air to the internal space for cooling the internal space.

13. The method of claim 12, wherein the warm dry air and the cooled dry air are maintained separate from the stream of cool, moist air.

14. The method of claim 1, further comprising the step of transporting the stream of cool, moist air to the internal space for cooling the internal space.

15. A system for cooling an internal space, comprising:
   a laminate including a hydrophobic membrane and a hydrophilic membrane;
   a water source for supplying water to the hydrophilic membrane, resulting in the transporting and distribution of water from the source across the hydrophilic membrane; and
   an evaporation device for evaporating water from the hydrophilic membrane, resulting in evaporative cooling of the laminate and the formation of a stream of cool, moist air from the hydrophilic membrane;
   wherein the hydrophilic membrane comprises a superabsorbent polymer.

16. The system of claim 15, wherein the superabsorbent polymer is applied directly to the hydrophobic membrane.

17. The system of claim 15, wherein the hydrophilic membrane comprises a base material to which the superabsorbent polymer is applied.

18. The system of claim 15, wherein the superabsorbent polymer is selected from the group consisting of hydrolyzed acrylonitrile-grafted starch; acrylic acid-grafted starch; methyl cellulose; chitosan; carboxymethyl cellulose; hydroxypropyl cellulose; natural gums; alkali metal and ammonium salts of polyacrylic acid, polymethacrylic acid, polyacrylamides and polyvinyl ethers; hydrolyzed maleic anhydride copolymers with vinyl ethers and alpha-olefins; polyvinyl pyrrolidone; polyvinyl morpholinone; polyvinyl alcohol; chloride and hydroxide salts of polyvinyl amine; polyquaternary ammonium polyamine; hydrolyzed polyamide; and combinations of the foregoing with each other and with zeolites.

19. The system of claim 15, wherein the water source comprises a water pool and one end of the laminate is immersed in the pool, resulting in wicking of water across the hydrophilic membrane.

20. The system of claim 15, wherein the evaporation device comprises a stream of warm dry air.

21. The system of claim 15, further comprising a source of warm dry air applied to the hydrophobic membrane of the cooled laminate, resulting in cooled dry air.

22. The system of claim 15, further comprising a device for transporting the cool moist air to the internal space.

23. The system of claim 21, further comprising a device for transporting the cooled dry air to the internal space.

24. The system of claim 15, wherein the superabsorbent polymer is crosslinked.

25. A system for cooling an internal space, comprising:
a laminate including a hydrophobic membrane and a hydrophilic membrane, the hydrophilic membrane including a crosslinked superabsorbent polymer;
a water source;
apparatus for distributing water from the water source across the hydrophilic membrane;
apparatus for evaporating water from the hydrophilic membrane to cause evaporative cooling of the laminate; and
apparatus for generating and transporting cooled air from the evaporatively cooled laminate to the internal space, for cooling of the internal space.

* * * * *